(12) United States Patent
Chuang et al.

(10) Patent No.: US 10,115,360 B2
(45) Date of Patent: Oct. 30, 2018

(54) GATE DRIVER

(71) Applicant: Raydium Semiconductor Corporation, Hsinchu (TW)

(72) Inventors: Kai-Lan Chuang, Tainan (TW); Chien-Ru Chen, Tainan (TW)

(73) Assignee: Raydium Semiconductor Corporation, Hsinchu County (TW)

( * ) Notice: Subject to any disclaimer, the term of this patent is extended or adjusted under 35 U.S.C. 154(b) by 0 days.

(21) Appl. No.: 15/647,552

(22) Filed: Jul. 12, 2017

(65) Prior Publication Data
US 2018/0075815 A1 Mar. 15, 2018

Related U.S. Application Data

(60) Provisional application No. 62/393,152, filed on Sep. 12, 2016.

(51) Int. Cl.
*G09G 3/36* (2006.01)
*G02F 1/1345* (2006.01)
*G09G 3/325* (2016.01)

(52) U.S. Cl.
CPC ....... *G09G 3/3648* (2013.01); *G02F 1/13454* (2013.01); *G09G 3/325* (2013.01); *G09G 3/3677* (2013.01); *G09G 3/3696* (2013.01); *G09G 2310/0264* (2013.01); *G09G 2330/028* (2013.01)

(58) Field of Classification Search
USPC .......................................... 363/60; 307/110
See application file for complete search history.

(56) References Cited

U.S. PATENT DOCUMENTS

2014/0002146 A1* 1/2014 Kim ................. H03K 17/08104
327/109

* cited by examiner

*Primary Examiner* — Jennifer Mehmood
*Assistant Examiner* — Deeprose Subedi

(57) ABSTRACT

A gate driver includes a gate driving main circuit and a power sequence control circuit. The gate driving main circuit disposed between an operating voltage and ground is coupled to a first gate voltage and a second gate voltage. The operating voltage is higher than ground and first gate voltage is higher than second gate voltage. The power sequence control circuit includes first-type transistors, a second-type transistor, a transistor and a judging circuit. The first-type transistors are coupled in series between first gate voltage and a first node and their gates are coupled to a second node. The second-type transistor is coupled between first node and second gate voltage and its gate is coupled to second node. The transistor is coupled between first gate voltage and gate driving main circuit and its gate is coupled to first node. The judging circuit generates an output signal to second node.

8 Claims, 4 Drawing Sheets

GATE DRIVER

BACKGROUND OF THE INVENTION

1. Field of the Invention

This invention relates to a display, especially to a gate driver applied to a liquid crystal display.

2. Description of the Prior Art

In general, power supply of a gate driver in a LCD apparatus usually includes the low-voltage operating voltage VDD and ground voltage VSS and the high-voltage first gate voltage VGH and second gate voltage VGL. Their ideal power on/off sequence is shown in FIG. 1. As shown in FIG. 1, the power of the gate driver is supplied by the operating voltage VDD at first, and then supplied by the second gate voltage VGL, at last supplied by the first gate voltage VGH.

It is assumed that the actual power on/off sequence of gate driver power supply is shown in FIG. 2, it will cause some effects; for example, when the power of the gate driver is supplied by the first gate voltage VGH, since the second gate voltage VGL is not supplied yet, the transient current flowing from the first gate voltage VGH to the second gate voltage VGL may be generated accordingly. As a result, latch-up phenomenon occurs due to voltage rise and even the gate driver IC is damaged.

In order to solve the above-mentioned problems, power sequence control circuit is usually used to control the order of the first gate voltage VGH and the second gate voltage VGL entering into the gate driver. For example, as shown in FIG. 3, the power supply of the gate driver GD includes an operating voltage VDD, a ground voltage VSS, a second gate driver VGL and a first gate voltage VGH. The power supply of the gate driving main circuit GDMC includes the operating voltage VDD, the ground voltage VSS, the second gate driver VGL and an input gate voltage VGHin.

After the power is supplied by the operating voltage VDD, the power is supplied by the first gate voltage VGH; at this time, the second gate voltage VGL is 0V, the N-type transistor MN1 is switched off, the voltage of the node A is equal to the first gate voltage VGH, the transistor MPSW is switched off, the input gate voltage VGHin of the input terminal IN will be in floating state. Until the power starts to be supplied by the second gate voltage VGL, the N-type transistor MN1 is switched on, the voltage of the node A is equal to the second gate voltage VGL, the transistor MPSW is switched on; at this time, the input gate voltage VGHin of the input terminal IN will be equal to the first gate voltage VGH.

By doing so, no matter the power supplying order of the second gate voltage VGL and the first gate voltage VGH out of the gate driving main circuit GDMC, the power will be always supplied by the second gate voltage VGL at first and then supplied by the first gate voltage VGH in the gate driving main circuit GDMC. Therefore, the aim of controlling power on/off sequence can be achieved.

The conventional power sequence control circuit can be used to control the order of the second gate voltage VGL and the first gate voltage VGH entering into the gate driver; however, in practical applications, since all transistors used in the conventional power sequence control circuit are high-voltage components, their threshold voltages (VTH) are about 3V; therefore, if the second gate voltage VGL needs to be a higher voltage (e.g., −2V), the gate-source voltage VGS of the N-type transistor MN1 will be 2V which is still lower than the threshold voltage (VTH=3V), so that the N-type transistor MN1 will be switched off, the voltage of the node A will be VGH and the transistor MPSW will be also switched off. As a result, the input gate voltage VGHin will be in floating state and the gate driving main circuit GDMC will not work normally.

SUMMARY OF THE INVENTION

Therefore, the invention provides a gate driver applied to a liquid crystal display to solve the above-mentioned problems.

An embodiment of the invention is a gate driver. In this embodiment, the gate driver is applied to a liquid crystal display panel. The gate driver includes a gate driving main circuit and a power sequence control circuit. The gate driving main circuit is disposed between an operating voltage and a ground voltage and coupled to a first gate voltage and a second gate voltage respectively, wherein the operating voltage is higher than the ground voltage; the first gate voltage is higher than the second gate voltage. The power sequence control circuit is coupled to the gate driving main circuit. The power sequence control circuit includes a plurality of first-type transistors, a second-type transistor, a transistor and a judging circuit. The plurality of first-type transistors is coupled in series between the first gate voltage and a first node, wherein gates of the plurality of first-type transistors are coupled to a second node. The second-type transistor is coupled between the first node and the second gate voltage, wherein a gate of the second-type transistor is coupled to the second node. The transistor is coupled between the first gate voltage and the gate driving main circuit, wherein a gate of the transistor is coupled to the first node. The judging circuit is disposed between the operating voltage and the ground voltage and coupled to the second gate voltage and the second node respectively, for generating an output signal to the second node.

In an embodiment, the plurality of first-type transistors and the transistor are P-type transistors and the second-type transistor is an N-type transistor.

In an embodiment, the judging circuit compares the second gate voltage with the ground voltage to generate a comparing result.

In an embodiment, if the comparing result is that the second gate voltage is equal to the ground voltage, then the judging circuit generates the output signal to the second node to make a voltage of the second node equal to the ground voltage.

In an embodiment, if the comparing result is that the second gate voltage is lower than the ground voltage, then the judging circuit generates the output signal to the second node to make a voltage of the second node equal to the operating voltage.

In an embodiment, when the voltage of the second node is equal to the operating voltage, the second-type transistor will be switched on to pull a voltage of the first node down to the second gate voltage.

In an embodiment, when the voltage of the first node is equal to the second gate voltage, the transistor will be switched on to let the gate driving main circuit receive the first gate voltage.

In an embodiment, the judging circuit includes a comparator coupled between the operating voltage and the ground voltage, an output terminal of the comparator is coupled to the second node, and a first input terminal and a second input terminal of the comparator receive a first input signal and a second input signal respectively.

In an embodiment, the power sequence control circuit further includes a first voltage-dividing resistor string and a second voltage-dividing resistor string. The first voltage-dividing resistor string is disposed between the operating voltage and the second gate voltage and coupled to the first input terminal of the comparator and used for generating the first input signal to the first input terminal of the comparator according to the operating voltage and the second gate voltage. The second voltage-dividing resistor string is disposed between the operating voltage and the ground voltage and coupled to the second input terminal of the comparator and used for generating the second input signal to the second input terminal of the comparator according to the operating voltage and the ground voltage.

In an embodiment, the output signal outputted by the judging circuit to the second node has a voltage range between the operating voltage and the ground voltage.

Compared to the prior art, the gate driver of the invention uses a simple circuit including voltage dividing resistor and comparator to make the power sequence control circuit still work normally when the second gate voltage VGL is a high voltage. Therefore, the order of the second gate voltage VGL and the first gate voltage VGH entering into the gate driving main circuit can be effectively controlled in the invention to make the gate driver of the invention work normally.

The advantage and spirit of the invention may be understood by the following detailed descriptions together with the appended drawings.

BRIEF DESCRIPTION OF THE APPENDED DRAWINGS

DETAILED DESCRIPTION OF THE INVENTION

A preferred embodiment of the invention is a gate driver. In this embodiment, the gate driver is applied to a LCD apparatus.

Figure 1:
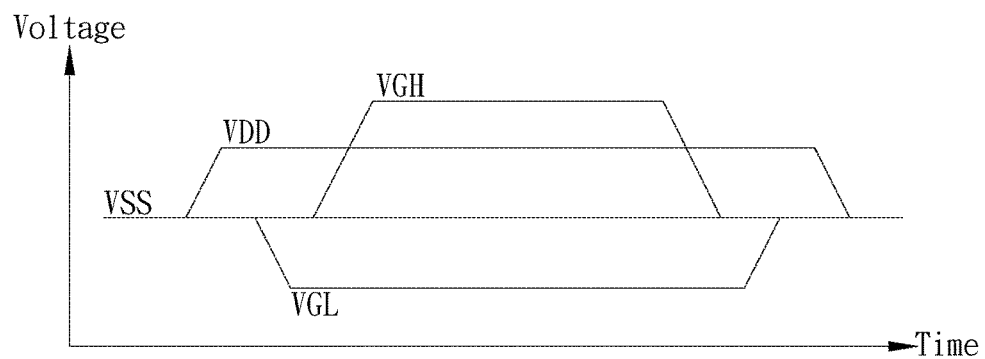
FIG. 1 and FIG. 2 illustrate schematic diagrams of different power on/off sequences respectively.
Figure 2:
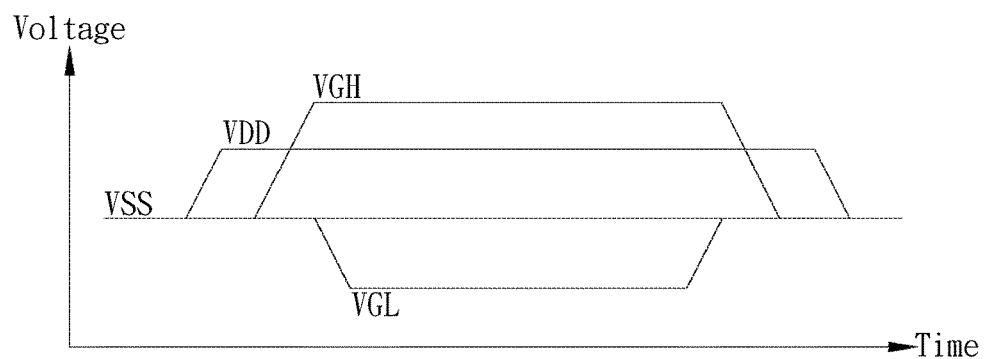
Figure 3:
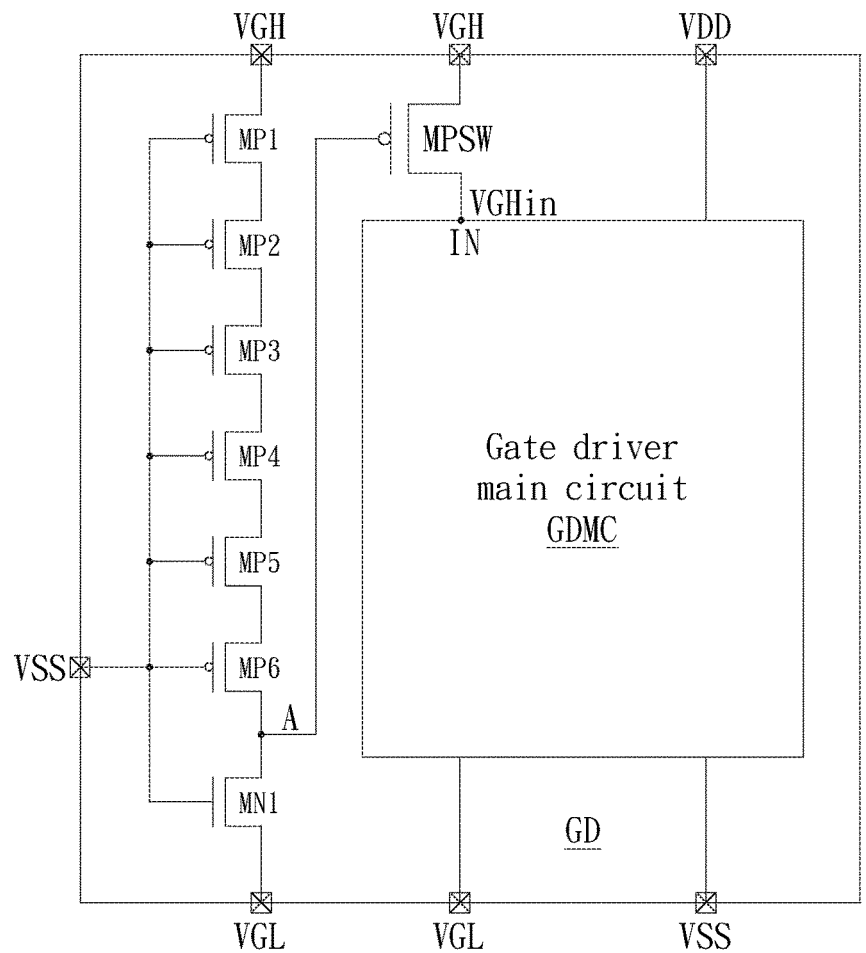
FIG. 3 illustrates a schematic diagram of the conventional power sequence control circuit controlling the order of the first gate voltage VGH and the second gate voltage VGL entering into the gate driving main circuit GDMC.
Figure 4:
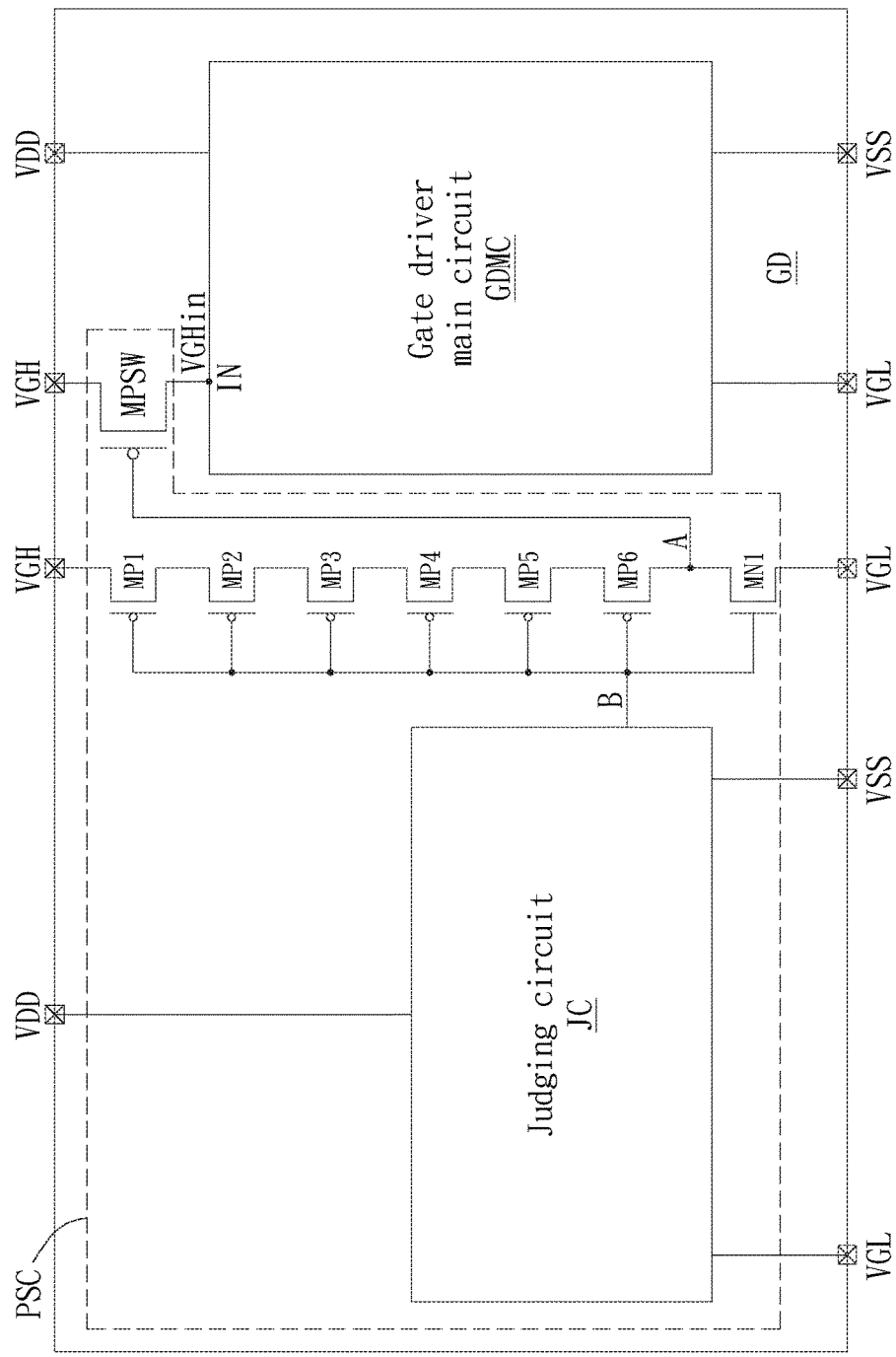
FIG. 4 illustrates a schematic diagram of the gate driver in a preferred embodiment of the invention.

Please refer to FIG. 4. FIG. 4 illustrates a schematic diagram of the gate driver in this embodiment. As shown in FIG. 4, the gate driver GD includes a gate driving main circuit GDMC and a power sequence control circuit PSC. The power sequence control circuit PSC is coupled to the gate driving main circuit GDMC.

The gate driving main circuit GDMC is coupled to the operating voltage VDD, the ground voltage VSS, the first gate voltage VGH and the second gate voltage VGL, wherein the operating voltage VDD is higher than the ground voltage VSS and the first gate voltage VGH is higher than the second gate voltage VGL.

The power sequence control circuit PSC includes a plurality of first-type transistors MP1~MP6, a second-type transistor MN1 and a transistor MPSW. It should be noticed that the plurality of first-type transistors MP1~MP6 are P-type transistors, the second-type transistor MN1 is an N-type transistor, the transistor MPSW is a P-type transistor and the number of the first-type transistors MP1~MP6 are six, but not limited to this.

The plurality of first-type transistors MP1~MP6 is coupled in series between the first gate voltage VGH and the first node A, and gates of the plurality of first-type transistors MP1~MP6 are coupled to the second node B. The second-type transistor MN1 is coupled between the first node A and the second gate voltage VGL and the gate of the second-type transistor MN1 is coupled to the second node B. The transistor MPSW is coupled between the first gate voltage VGH and the gate driving main circuit GDMC and the gate of the transistor MPSW is coupled to the first node A.

The judging circuit JC is coupled between the operating voltage VDD and the ground voltage VSS and coupled to the second gate voltage VGL and the second node B respectively. The judging circuit JC is used to compare the second gate voltage VGL with the ground voltage VSS to generate a comparing result and then the judging circuit JC generates an output signal to the second node B according to the comparing result. In practical applications, the output signal outputted by the judging circuit JC to the second node B has a voltage range between the operating voltage VDD and the ground voltage VSS.

If the comparing result of the judging circuit JC is that the second gate voltage VGL is equal to the ground voltage VSS, then the judging circuit JC will generate the output signal to the second node B to make a voltage of the second node B equal to the ground voltage VSS. If the comparing result of the judging circuit JC is that the second gate voltage VGL is lower than the ground voltage VSS, then the judging circuit JC will generate the output signal to the second node B to make a voltage of the second node B equal to the operating voltage VDD.

When the voltage of the second node B is equal to the operating voltage VDD, the second-type transistor MN1 will be switched on to pull a voltage of the first node A down to the second gate voltage VGL. When the voltage of the first node A is equal to the second gate voltage VGL, the transistor MPSW will be switched on to let the gate driving main circuit GDMC receive the first gate voltage VGH.

Figure 5:
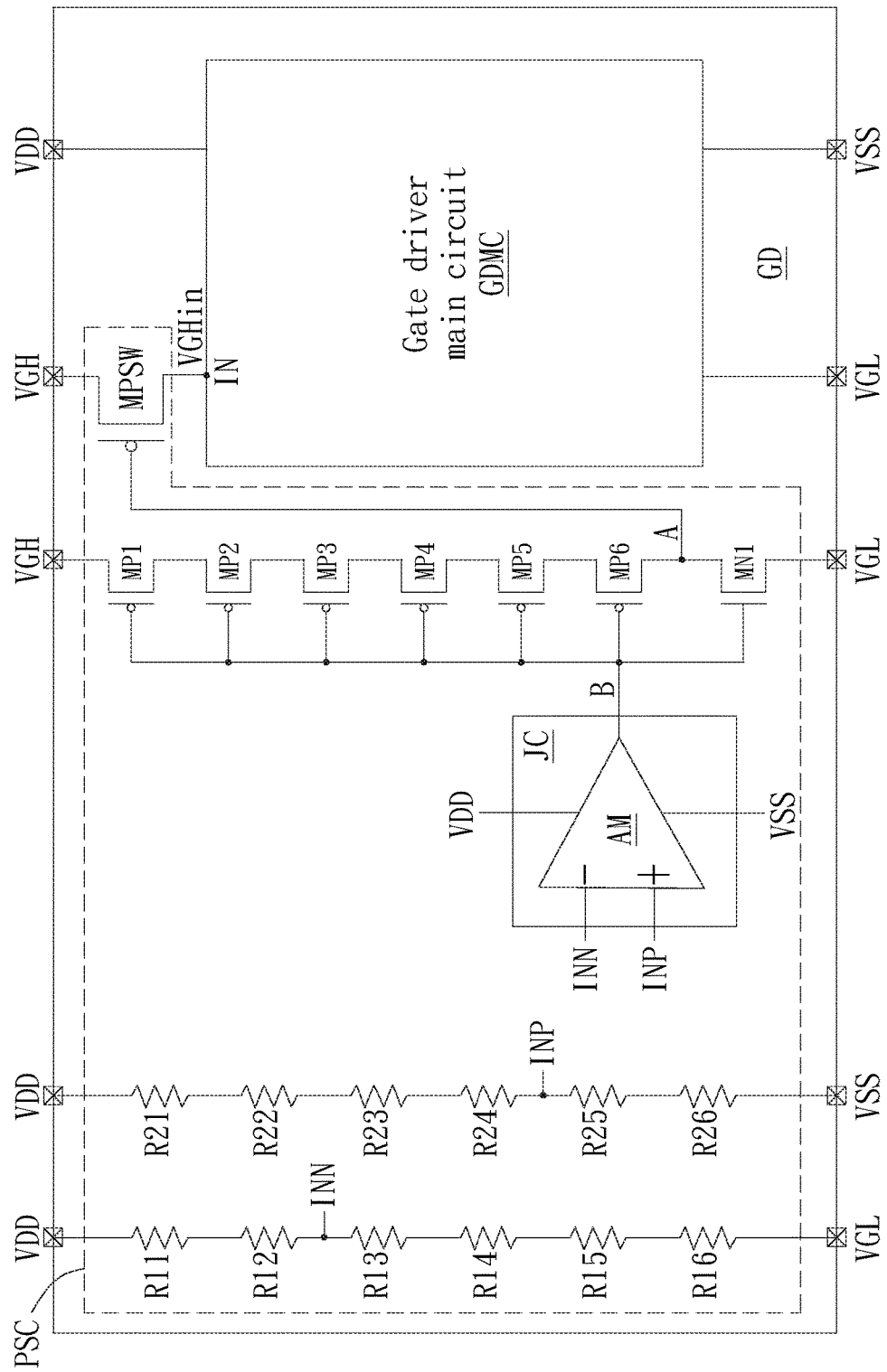
FIG. 5 illustrates a schematic diagram of the gate driver in another preferred embodiment of the invention.

In another embodiment, as shown in FIG. 5, the power sequence control circuit PSC further includes a first voltage-dividing resistor string R11~R16 and a second voltage-dividing resistor string R21~R26. The first voltage-dividing resistor string R11~R16 is disposed between the operating voltage VDD and the second gate voltage GL. The second voltage-dividing resistor string R21~R26 is disposed between the operating voltage VDD and the ground voltage VSS. The judging circuit JC can include a comparator AM. The comparator AM is coupled between the operating voltage VDD and the ground voltage VSS. An output terminal of the comparator AM is coupled to the second node B and a first input terminal − and a second input terminal + of the comparator AM receive a first input signal INN and a second input signal INP respectively.

In this embodiment, the first input terminal − of the comparator AM is coupled between two resistors R12 and R13 of the first voltage-dividing resistor string R11~R16, namely the first input signal INN received by the first input terminal − of the comparator AM is generated from the voltage dividing that the first voltage-dividing resistor string R11~R16 performs on the operating voltage VDD and the second gate voltage VGL.

Similarly, the second input terminal + of the comparator AM is coupled between two resistors R24 and R25 of the second voltage-dividing resistor string R21~R26, namely the second input signal INP received by the second input terminal + of the comparator AM is generated from the voltage dividing that the second voltage-dividing resistor string R21~R26 performs on the operating voltage VDD and the ground voltage VSS.

It should be noticed that the first input signal INN received by the first input terminal − of the comparator AM and the second input signal INP received by the second input terminal + of the comparator AM are both adjustable. For example, the first input terminal − of the comparator AM can be coupled between different two resistors of the first voltage-dividing resistor string R11~R16 to adjust the voltage of the first input signal INN; the second input terminal + of the comparator AM can be coupled between different two resistors of the second voltage-dividing resistor string R21~R26 to adjust the voltage of the second input signal INP.

Compared to the prior art, the gate driver of the invention uses a simple circuit including voltage dividing resistor and comparator to make the power sequence control circuit still work normally when the second gate voltage VGL is a high voltage. Therefore, the order of the second gate voltage VGL and the first gate voltage VGH entering into the gate driving main circuit can be effectively controlled in the invention to make the gate driver of the invention work normally.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A gate driver, applied to a liquid crystal display panel, the gate driver comprising:
   a gate driving main circuit, disposed between an operating voltage and a ground voltage and coupled to a first gate voltage and a second gate voltage respectively, wherein the operating voltage is higher than the ground voltage; the first gate voltage is higher than the second gate voltage; and
   a power sequence control circuit, coupled to the gate driving main circuit, comprising:
   a plurality of first-type transistors, coupled in series between the first gate voltage and a first node, wherein gates of the plurality of first-type transistors are coupled to a second node;
   a second-type transistor, coupled between the first node and the second gate voltage, wherein a gate of the second-type transistor is coupled to the second node;
   a transistor, coupled between the first gate voltage and the gate driving main circuit, wherein a gate of the transistor is coupled to the first node; and
   a judging circuit, disposed between the operating voltage and the ground voltage and coupled to the second gate voltage and the second node respectively, wherein the judging circuit is configured to generate an output signal to the second node;
   wherein the judging circuit compares the second gate voltage with the ground voltage to generate a comparing result if the comparing result is that the second gate voltage is equal to the ground voltage, then the judging circuit generates the output signal to the second node to make a voltage of the second node equal to the ground voltage.

2. The gate driver of claim 1, wherein the plurality of first-type transistors and the transistor are P-type transistors and the second-type transistor is an N-type transistor.

3. A gate driver, applied to a liquid crystal display panel, the gate driver comprising:
   a gate driving main circuit, disposed between an operating voltage and a ground voltage and coupled to a first gate voltage and a second gate voltage respectively, wherein the operating voltage is higher than the ground voltage; the first gate voltage is higher than the second gate voltage; and
   a power sequence control circuit, coupled to the gate driving main circuit, comprising:
   a plurality of first-type transistors, coupled in series between the first gate voltage and a first node, wherein gates of the plurality of first-type transistors are coupled to a second node;
   a second-type transistor, coupled between the first node and the second gate voltage, wherein a gate of the second-type transistor is coupled to the second node;
   a transistor, coupled between the first gate voltage and the gate driving main circuit, wherein a gate of the transistor is coupled to the first node; and
   a judging circuit, disposed between the operating voltage and the ground voltage and coupled to the second gate voltage and the second node respectively, wherein the judging circuit is configured to generate an output signal to the second node;
   wherein the judging circuit compares the second gate voltage with the ground voltage to generate a comparing result if the comparing result is that the second gate voltage is lower than the ground voltage, then the judging circuit generates the output signal to the second node to make a voltage of the second node equal to the operating voltage.

4. The gate driver of claim 3, wherein when the voltage of the second node is equal to the operating voltage, the second-type transistor will be switched on to pull a voltage of the first node down to the second gate voltage.

5. The gate driver of claim 4, wherein when the voltage of the first node is equal to the second gate voltage, the transistor will be switched on to let the gate driving main circuit receive the first gate voltage.

6. The gate driver of claim 1, wherein the judging circuit comprises a comparator coupled between the operating voltage and the ground voltage, an output terminal of the comparator is coupled to the second node, and a first input terminal and a second input terminal of the comparator receive a first input signal and a second input signal respectively.

7. The gate driver of claim 5, wherein the power sequence control circuit further comprises:
   a first voltage-dividing resistor string, disposed between the operating voltage and the second gate voltage and coupled to the first input terminal of the comparator, for generating the first input signal to the first input terminal of the comparator according to the operating voltage and the second gate voltage; and
   a second voltage-dividing resistor string, disposed between the operating voltage and the ground voltage and coupled to the second input terminal of the comparator, for generating the second input signal to the second input terminal of the comparator according to the operating voltage and the ground voltage.

8. The gate driver of claim 1, wherein the output signal outputted by the judging circuit to the second node has a voltage range between the operating voltage and the ground voltage.

* * * * *